United States Patent
Gruber

[15] 3,652,071
[45] Mar. 28, 1972

[54] TILTABLE CONVERTER SUPPORTING MECHANISM

[72] Inventor: Heinz Gruber, Neuhofen, Krems, Austria

[73] Assignee: Vereinigte Osterreichische Eisen-und Stahlwerke Aktiengesellschaft, Muldenstrasse Linz, Austria

[22] Filed: Oct. 15, 1970

[21] Appl. No.: 81,052

[30] Foreign Application Priority Data

Apr. 16, 1970 Australia..............................A 3456/70

[52] U.S. Cl............................................................266/36 P
[51] Int. Cl................................................................C21c 5/50
[58] Field of Search...........................................266/35, 36 P

[56] References Cited

UNITED STATES PATENTS

| | | | |
|---|---|---|---|
| 1,088,401 | 2/1914 | Bretaud | 266/36 P |
| 3,191,922 | 6/1965 | Puhringer | 266/36 P |
| 3,239,206 | 3/1966 | Puxkandl | 266/36 P |
| 3,350,082 | 10/1967 | Lambrecht et al. | 266/36 P |
| 3,357,691 | 12/1967 | Metz et al. | 266/35 |
| 3,385,588 | 5/1968 | Puxkandl | 266/36 P |
| 3,430,941 | 3/1969 | Lambrecht et al. | 266/36 P |

FOREIGN PATENTS OR APPLICATIONS 1,946,246 7/1970 Germany..............................266/36 P Primary Examiner—Robert D. Baldwin
Assistant Examiner—John E. Roethel
Attorney—Brumbaugh, Graves, Donohue & Raymond

[57] ABSTRACT

The invention relates to a tiltable converter comprising supporting trunnions fixed to the converter shell and a bearing structure surrounding the converter shell for at least half of its circumference, the supporting trunnions being mounted in bearing bushings which are releasably connected with the bearing structure, in which the improvement resides in that the bearing bushings are attached to the bearing structure by means of drawing hooks which are slewable in and out of an engagement position. Suitably, at least two pairs of hinged drawing hooks are provided per supporting trunnion and are capable of being tightened together by a common turnbuckle under exertion of a clamping force urging said bushing and trunnion against said converter bearing structure.

10 Claims, 6 Drawing Figures

PATENTED MAR 28 1972 3,652,071

INVENTOR.
HEINZ GRUBER
BY Brumbaugh, Graves,
Donohue & Raymond
his ATTORNEYS.

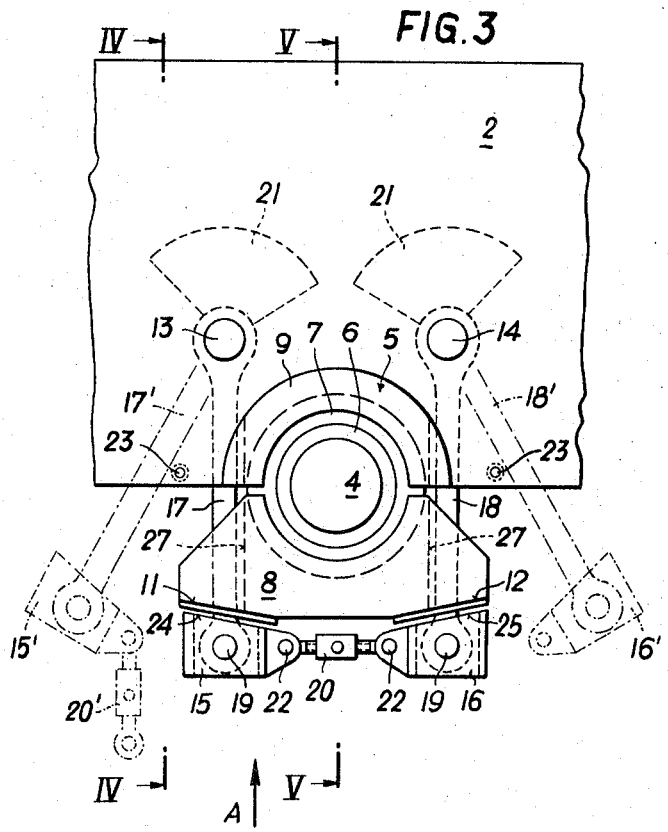
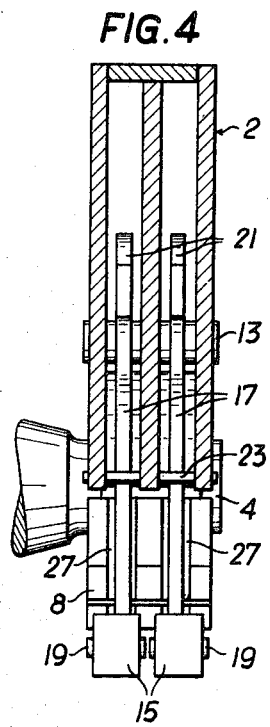
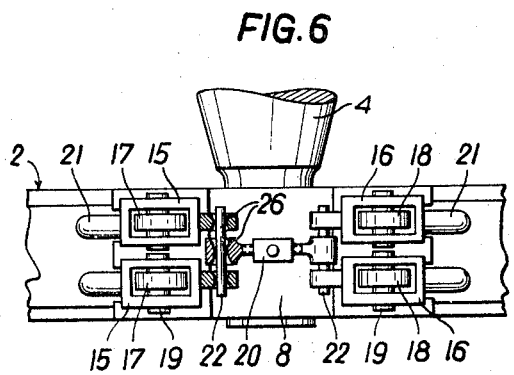
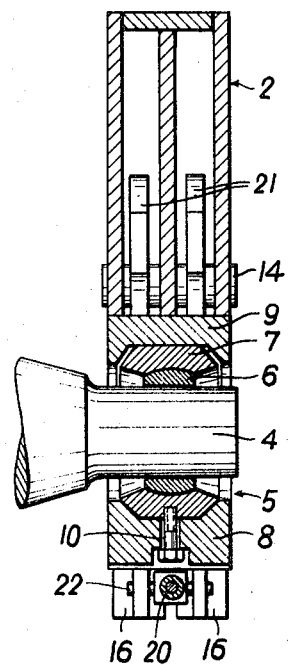

TILTABLE CONVERTER SUPPORTING MECHANISM

The invention relates to a tiltable converter with supporting trunnions fixed to the converter shell and a bearing structure surrounding the converter shell for at least half of its circumference, the supporting trunnions being arranged in bearing bushings which are releasably connected with the bearing structure. When the connection between the bearing bushings and the bearing structure is released, such converters may be built out of the converter stand and conveyed to a repair stand to be re-lined. The converter under repair may be replaced by a newly lined stand-by converter. After an operation period of 10 to 14 days the refractory lining of the converter is worn to a degree that re-lining is necessary. The exchange of converters should take place as rapidly as possible so as to keep the downtime short, it should involve little work and few workmen should suffice for carrying out the job. Known arrangements for converters which are releasably connected with their carrying structures do not meet these demands sufficiently or are not suitable for high charge weights.

In the United Kingdom Pat. specification No. 993.573, Canadian Pat. specification No. 721.341, U.S. Pat. No. 3,239.206 a converter is described having three supporting trunnions fixed to its shell, the supporting trunnions being inserted into window-shaped recesses of the horse-shoe-shaped supporting body, which recesses are open at the sides. The supporting trunnions are maintained in these recesses by means of screws. When the converter is dismounted, at first the screws have to be released, then the converter has to be lifted somewhat and horizontally displaced before it may be lowered onto a vehicle. Mounting and dismounting of the converter is relatively time-consuming. The supporting body has to be open on one side which is unsuitable for great and heavy converters.

In the U.S. Pat. No. 3,350.082, United Kingdom Pat. specification No. 1,114.902 a further converter is described with three supporting trunnions extending from its shell which are releasably connected with a bearing body open on one side by means of hinged brackets. Hinged brackets maintain one supporting trunnion in a recess of the bearing body which recess is open in downward direction and the other two supporting trunnions in recesses of the bearing body which are open upward direction. Such hinged brackets have a weight of several metric tons and cannot be moved except with tackles. The hinged brackets are connected with the bearing body by means of at least two screws. When the converter is dismounted the screw connections have to be released; this can be done only by means of very heavy tools because of the great size and the heavy weight of the screws, and has to be carried out by several workmen. In the case of greater and heavy converters with a holding capacity of more than 60 m.$^3$ the screws have to be dimensioned so large that the screw connections can no longer be released by hand. When these screw connections are released and the hinged brackets are folded by means of a crane into the release position, the bearing body has to be tilted somewhat, whereupon the converter may be horizontally displaced, lowered and moved out of the converter stand. When converter assemblies of this kind are used an exchange of converters causes a long downtime. The screw connections are exposed to splashes of slag and steel and thus they lose their capability of being released.

In the United Kingdom Pat. specification No. 1,124.038 U.S. Pat. No. 3,430.941 a converter is described having supporting trunnions fixed to its shell, which trunnions are releasably connected with a bearing body open on one side. The supporting trunnions are surrounded by bushings which may be fixed to the bearing body by means of spring-supported screws. Each supporting trunnion or each bushing, respectively, is connected with the converter by four screws.

When the converter is mounted or dismounted a comparatively great number of screw connections has to be released or re-established, respectively. The size of the converter is limited to a holding capacity of below 80 m.$^3$, corresponding to a tapping weight of 100 metric tons, because only two screws find room side by side on the pre-determined width of the bearing body, so that it is impossible to use any desired amount of screws. When a greater number of screws is employed the danger of stress being unevenly exerted on the screws, which is present also in the case of only four screws, would increase.

Finally, in the Canadian Pat. specification No. 788.829, U.S. Pat. No. 3,357.691 and United Kingdom Pat. specification No. 1,076.266, a converter is described which is releasably connected by means of its supporting elements with a closed bearing body surrounding its shell. The supporting elements are designed to be pairs of claws projecting in upward and downward direction beyond the bearing body. The lower claws are slewable in upward and downward direction. The bearing body is either triangular or polygonal. When the converter is to be released from the bearing body the lower claws are folded downwardly, whereupon the converter may be lifted a little and turned so far that the pairs of claws get from their engagement position in the middle of the sides of the triangular or polygonal bearing body into the non-engagement position at the corners of said body. Then the converter may be lowered through the closed bearing body. This construction is expensive. The lower, slewable claws are heavy construction parts which may jam under the influence of heat and cannot be slewn by hand.

The invention avoids the described disadvantages and difficulties and is aimed at creating a converter which is, by hand, easily and rapidly releasable from its bearing structure and may easily and rapidly be connected therewith. Further, it should be possible that the assembly according to the invention may be used in closed bearing structures and for all converter sizes.

In a tiltable converter of the kind defined in the introduction the invention resides in that the bearing bushings are attached to the bearing structure by means of drawing hooks which are slewable into and out of engagement position.

Preferably the bearing bushings comprise sleeves surrounding the supporting trunnions and bolting pieces which are connected with these sleeves, with which bolting pieces the drawing hooks, which may symmetrically to the bolting pieces be slewn in and out, may be brought into and out of engagement.

According to a suitable embodiment of the invention the bearing bushings may be inserted into half-cylindrical recesses provided at the bottom side of the bearing structure.

Advantageously the bolting pieces are provided on opposed sides with two planes which are symmetrically arranged and slanting towards the horizontal line, against which planes the heads of the slewable drawing hooks may be tightened preferably by means of a turnbuckle.

Suitably the shaft parts of the drawing hooks are pivotally supported within the bearing body which is designed as box construction, and the heads of the drawing hooks are linked to the ends of the shaft parts.

Preferably two or more drawing hooks are arranged side by side and to be slewable around the same axle, the heads of the drawing hooks being provided with bores through which a common bolt is inserted which is engaged by the turnbuckle for connection with the opposed drawing hooks under formation of a linkage. The bores of the heads of the drawing hooks are advantageously designed with convex surfaces facing the bolt so as to provide for a compensation of tension.

In the box-shaped bearing structure the shaft ends of the drawing hooks are preferably connected with counterweights.

Furthermore, the bearing sleeves are suitably designed in two parts, the inner sleeve being provided with a convex outer surface which fits into the corresponding concave inner surface of the outer sleeve, and the outer sleeve being connected with the bolting piece.

In order that the invention may be more fully understood an embodiment thereof shall now be explained with reference to the accompanying drawings.

FIGS. 3 to 6 show on an enlarged scale details of the connection between the converter and the bearing structure;

FIG. 3 is a lateral view of this connection,

FIG. 4 is a vertical sectional view along the line IV—IV of FIG. 3,

FIG. 5 is a vertical sectional view along the line V—V of FIG. 3, and

FIG. 6 is an elevational view in direction of the arrow A in FIG. 3.

Figure 1:
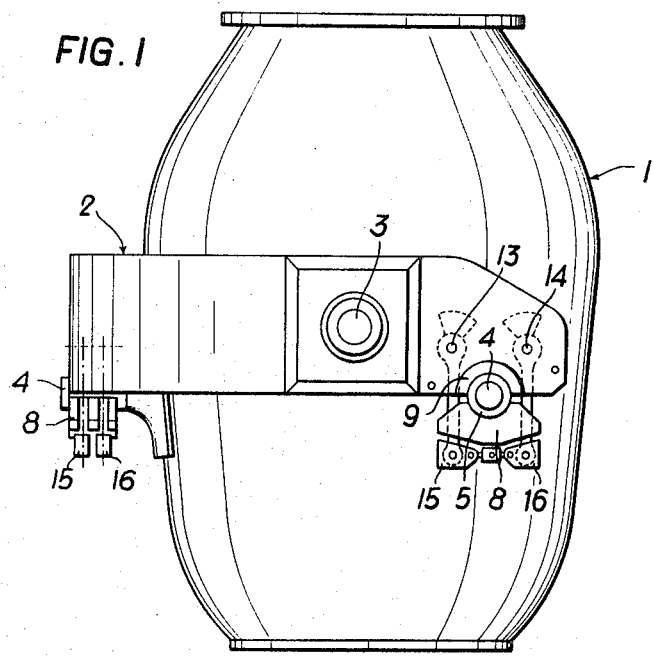
FIG. 1 is a front view of a converter which is releasably connected with its bearing structure.
Figure 2:
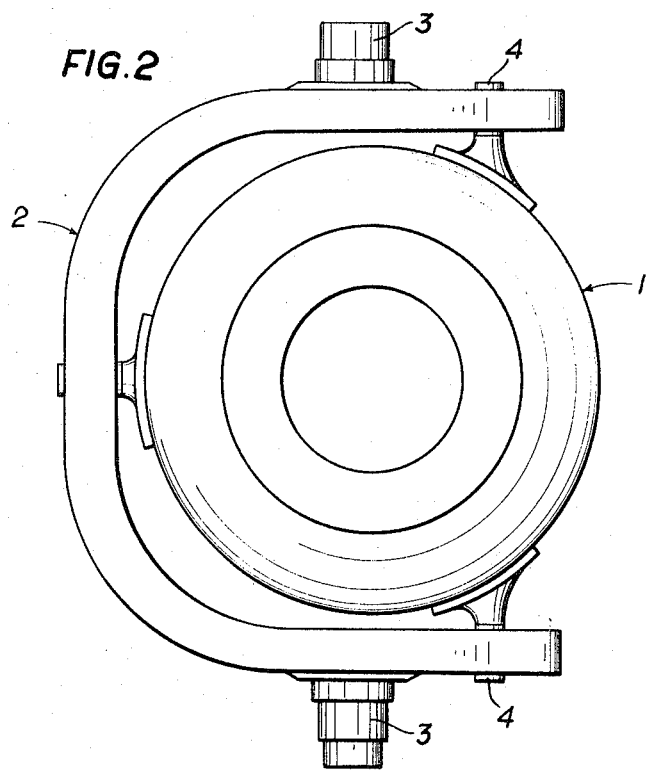
FIG. 2 is a plan view of said converter.

In FIG. 1 numeral 1 denotes the converter having a bearing structure 2. The bearing structure is horseshoe-shaped, but it may also be closed, and it is connected with the converter tilting trunnions 3. Supporting trunnions 4 are fixed to the shell of the converter, which trunnions 4 transfer the converter weight on to the bearing structure 2. Three supporting trunnions are provided, the radial planes laid through said trunnions including angles of substantially 120°; the converter thus is supported in a statically determinate manner in three points.

The supporting trunnions 4 are surrounded by bearing bushings 5 which are releasably connected with the bearing structure 2. The bearing bushings 5 are composed of an inner sleeve 6, an outer sleeve 7 and a bolting piece 8 which is fixed from below to the outer sleeve or ring, and engage with the bearing structure from below, along a faying surface. This faying surface is formed by the inner face of a bearing shell half 9 which is fitted into a recess in the supporting structure 2 which recess has a semicircular cross section. The bolting piece 8 is connected with the outer sleeve 7 of the bearing bushing 5 by means of a screw 10 and is provided on its bottom side with two planes 11, 12 which are symmetrically opposed to each other and slanting towards the horizontal line. Heads 15, 16 which are slewable around the axles 13, 14 may be tightened like wedges to these planes 11, 12. The heads 15, 16 are articulately fixed to shaft parts 17, 18 by means of bolts 19; these shaft parts 17, 18 are mounted on the bearing body 2 to be slewable around the axles 13, 14. The heads 15, 16 and the shaft parts 17, 18 form drawing hooks 15, 17 and 16, 18 which are slewable into and out of engagement with the bolting pieces 8. At least two drawing hooks 15, 17 and 16, 18 are opposed to each other and may be drawn towards each other by means of a turnbuckle 20; they co-act like wedges with the planes 11 or 12 of the bolting piece 8 whereby the bearing bushing 5 is pressed in upward direction against the faying surface of the bearing structure 2.

As may be derived from FIGS. 4 to 6, suitably two drawing hooks 15, 17 and 16, 18 which are slewable around a common axle 13 or 14 are in engagement with each plane 11 or 12 of a bolting piece 8; the drawing hooks are arranged in pairs. The pairs of heads 15, 16 which are opposed to each other may be connected and drawn towards each other by means of a common turnbuckle 20. By means of the four drawing hooks 15, 17 and 16, 18 co-acting in this manner and the turnbuckle 20, each of the bearing bushings together with the supporting trunnion which is surrounded by the bearing bushing may be tightened from below to the bearing structure.

The drawing hooks 15 to 18 are dimensioned in a manner that they may absorb the whole weight of the converter and the stress caused by tightening the turnbuckle. The shaft ends of the drawing hooks 15 - 18 are provided with counterweights 21 so that the hooks may more easily be slewn. The heads 15, 16 of the drawing hooks are articulately connected with the turnbuckle 20 by means of bolts 22.

The drawing hooks 15 - 18 guarantee a safe and simple releasable connection of the converter with the bearing structure. No heat tensions will occur in the bearing structure, because the heat expansion of the converter vessel is not impeded by the bearing structure. The trunnions 4 are axially displaceable in relation to the inner sleeve 6 of the bearing bushing 5. The inner sleeve 6 has a ball-shaped arched outer surface, which co-acts with a similarly arched inner surface of the outer sleeve 7. Thus even when the trunnion 4 is slanted the influence of heat does not cause additional stresses on the trunnion and the bearing structure.

A newly lined converter is mounted in a converter stand in the following manner. The converter 1 is moved by means of a lifting vehicle, not shown in the drawing, to a position below its bearing structure 2 and lifted until the bolting pieces 8 of the bearing bushings 5 surrounding the supporting trunnions 4 fit into recesses of the bearing structure 2 formed by the bearing shell halves 9. Then the pairs of drawing hooks 15, 17 and 16, 18 are slewn from the position 15', 17' and 16', 18' shown in FIG. 3 in dash-and-dot lines, into a position in which they are apposed to the planes 11 and 12 of the bolting pieces 8. In FIG. 3 the slewable parts are drawn in dashes and in the non-engagement position the reference numerals have strokes. The pairs of drawing hooks 15, 17 and 16, 18 are arrested in the position 15', 17' and 16', 18' by bolts 23 inserted through the bearing body 2, which bolts have to be removed before the hooks are slewn into engagement position. When the planes 24, 25 of the heads 15, 16 are apposed to the planes 11, 12 of the bolting pieces 8, the turnbuckle 20 which is fixed to one of the pairs of heads are connected with the other of the pairs of heads by inserting the bolt 22 into aligned bores 26 provided in the turnbuckle and in the other heads and then the turnbuckle is tightened.

When the converter is dismounted, the measures are taken in reverse order. The counterweights 21 are so dimensioned that after releasing of the turnbuckles 20 the drawing hooks are either automatically or by slight force of hand slewn into the position shown in FIG. 3 in dash lines.

It becomes evident from FIGS. 4 and 5 that the bearing structure 2 is a box construction. The shaft parts 17, 18 of the drawing hooks which are arranged on the axles 13, 14 within this construction, are sheltered against the influence of steel and slag splashes, as are the heads 15, 16 of the hooks. The bolting pieces 8 have recesses 27 in which the shaft parts 17, 18 are inserted. The heads 15, 17 are designed as hollow sections.

FIG. 6 shows details of the connection of the pairs of heads with the turnbuckle 20 by means of the bolts 22. The bolts 22 are inserted in the bores 26 having an embossed profile. Thus the bolts 22 may assume any slanted position, the tightening force of the turnbuckle 20 being distributed equally to the drawing hooks 15, 17 and 16, 18.

If, as shown in the drawing, all supporting trunnions may be tightened from below to the bearing structure by means of drawing hooks, the converter may be released and lowered from the bearing structure without having to be previously lifted or the bearing body having to be tilted. Furthermore, the supporting trunnions and the drawing hooks are arranged in a sheltered position. When the bearing structure is open on one side it is obviously also possible to form the supporting trunnions and the drawing hooks in a manner that the supporting trunnions may be tightened from above to the bearing structure. Finally, it is also possible to arrange one supporting trunnion above the bearing structure and the other supporting trunnion below the bearing structure.

In principle, it is possible—particularly with small converters—to make do with a total of two drawing hooks per supporting trunnion. The cross section of the drawing hooks may be enlarged and still they may be arranged within the bearing structure without any difficulties. In large converters it may prove advantageous to use for example eight drawing hooks per supporting trunnion, of which four on either side form a group and are connected with a common turnbuckle.

The invention thus may be used for converters of any size having an open or closed bearing structure. In the case of heavy converters the sliding planes 11, 12, 23, 24 enclose a somewhat smaller angle of inclination with the horizontal line so that the tension stresses occurring in the turnbuckle may be diminished. A single turnbuckle with a weight of only about 16 kg. may suffice per supporting trunnion; the bolts for fixing the turnbuckles to the drawing hooks have only a weight of about 5 kg.; thus, only one workman is needed for mounting and dismounting a converter.

What I claim is:

1. A tiltable converter comprising supporting trunnions fixed to the converter and a bearing structure surrounding the converter for at least half of its circumference and having bearing bushings releasably connected thereto for mounting engagement of said supporting trunnions, said bearing bushings being attached to said bearing structure by means of drawing hooks which are slewable into and out of an engagement position.

2. The converter set forth in claim 1, wherein the bearing bushings comprise sleeves surrounding the supporting trunnions and bolting pieces which are connected with said sleeves, the drawing hooks being adapted to be slewn into and out of engagement with said bolting pieces symmetrically to said bolting pieces.

3. The converter set forth in claim 1, wherein the bearing bushings fit into half-cylindrical recesses provided on the bottom side of the bearing structure.

4. The converter set forth in claim 1, wherein said drawing hooks are arranged in pairs and engage bolting pieces provided on each bearing bushing and having engagement planes which are symmetrically arranged and slanting towards the horizontal line, against which planes the drawing hooks with head portions thereof may be tightened.

5. A tiltable converter assembly comprising
a substantially cylindrical converter body,
a bearing structure having diametrically opposed tilting trunnions surrounding said converter body for at least half of its circumference,
a number of supporting trunnions extending from said converter body,
a corresponding number of bearing bushings comprising at least one sleeve engaging said supporting trunnions,
a number of substantially semi-cylindrical recesses in said bearing structure for accommodation of said bearing bushings,
a bolting piece connected to a sleeve of each bearing bushing in a manner as to project away from a corresponding recess,
at least one pair of drawing hooks hingedly mounted on said bearing structure in the vicinity of each recess,
facing hook-heads on the drawing hooks of each pair adapted to be swung in opposite directions into and out of engagement with said bolting piece for releasable connection of said bearing bushing to said bearing structure,
and a turnbuckle releasably connecting said facing hook-heads and operable to tighten them against wedge-type engagement planes of said bolting piece.

6. The converter set forth in claim 5, wherein the drawing hooks with shaft parts thereof are arranged to be slewable within the bearing structure which is designed as box-construction and the hook-heads of the drawing hooks are linked to the free ends of the shaft parts.

7. The converter set forth in claim 5, wherein at least two drawing hooks are arranged side by side to be slewable around a common axle, the heads of the drawing hooks being provided with bores through which a common bolt is inserted which is engaged by the turnbuckle for providing a connection with the opposed drawing hooks under formation of a linkage.

8. The converter set forth in claim 5, wherein said heads of the drawing hooks have bores with convex inner surfaces so as to provide for a compensation of tension in relation to a bolt insertable therethrough for mounting said turnbuckle.

9. The converter set forth in claim 5, wherein said drawing hooks are hinged with their ends within a hollow of said bearing structure and have counterweights facilitating their release from engagement.

10. The converter set forth in claim 5, wherein each bearing bushing comprises an inner and an outer sleeve, said inner sleeve being provided with a convex outer surface which fits into the corresponding concave inner surface of said outer sleeve, and the outer sleeve being connected with the bolting piece.

* * * * *

PO-1050
(5/69)

UNITED STATES PATENT OFFICE
CERTIFICATE OF CORRECTION

Patent No. 3,652,071      Dated Mar. 28, 1972

Inventor(s) Heinz Gruber

It is certified that error appears in the above-identified patent and that said Letters Patent are hereby corrected as shown below:

First page, Item [73], "Muldenstrasse Linz, Austria" should read --Muldenstrasse, Linz, Austria--;

First page, Item [30], "Australia" should read --Austria--; and Col. 1, line 43, after "open" insert --in--.

Signed and sealed this 18th day of July 1972.

(SEAL)
Attest:

EDWARD M. FLETCHER, JR.
Attesting Officer

ROBERT GOTTSCHALK
Commissioner of Patents